Nov. 20, 1956  C. E. HOOD  2,770,906
FISHING DEVICE
Filed Oct. 17, 1955
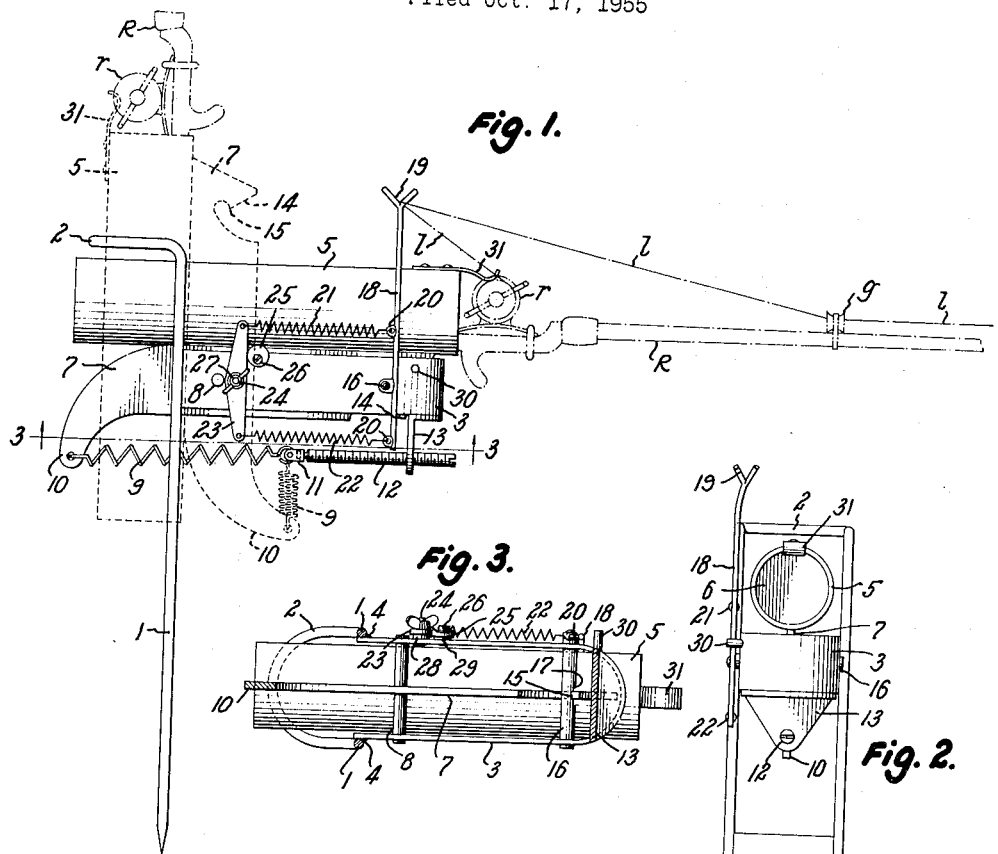
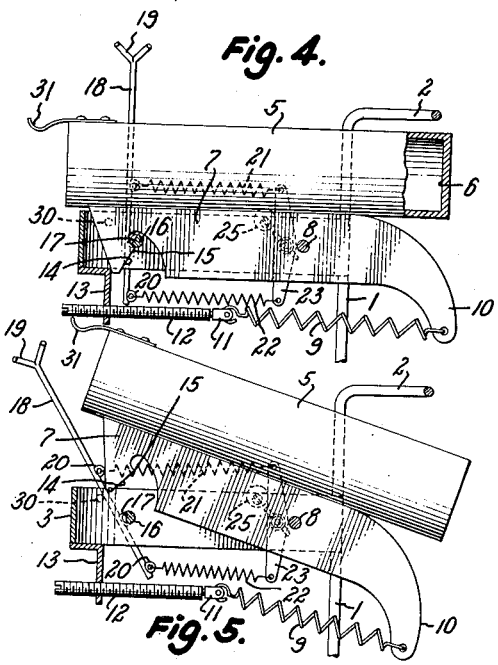
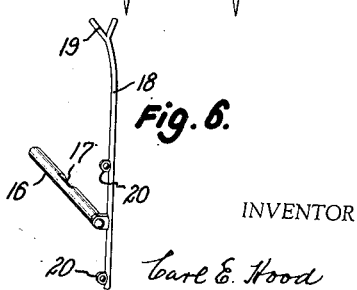
INVENTOR
Carl E. Hood
BY
ATTORNEY

United States Patent Office 2,770,906
Patented Nov. 20, 1956

2,770,906
FISHING DEVICE
Carl E. Hood, Darrouzett, Tex.
Application October 17, 1955, Serial No. 540,984
4 Claims. (Cl. 43—16)

This invention relates to fishing devices, and it has reference particularly to a device by which angling may be performed substantially automaticaly, so that the fisherman may, if desired, have a number of rods in operation at the same time and may service them individually, as required, when catches are made.

One object of the invention is to provide a device for holding a fishing rod, preferably after a cast has been made, in angling position, and provided with means responsive to a pull on the fishing line occasioned by a bite to automatically, and substantially instantaneously, elevate the rod to thus hook the biting fish.

Another object is to provide a device of this kind so constructed and capable of such functioning that it will simulate expert manual angling insofar as hooking of the fish is concerned, and will also permit the fisherman, after such hooking, to play the fish manually in accordance with his usual custom.

A further object is to provide in a device of this character exceedingly sensitive trigger means operable by the fishing line and responsive to a pull upon the line so that the substantially instantaneous elevation of the rod may be insured and hooking of the fish made certain, and, collaterally, to provide means whereby, when desired sensitiveness of the trigger means has been obtained, it may be maintained through repeated releasing and resetting.

A still further object of the invention is to provide a device which will automatically hook the fish, thus making unnecessary reliance upon the possibly ill-timed reaction of the fisherman to the bite of the fish, but will then enable the fisherman to play and land, or net, the fish as circumstances may dictate.

Still another object is to provide a device of this character in which means are provided for controlling run-out of line from the reel so that, when a fish is automatically hooked and the rod elevated, snarls and "birds-nests" of slack line will be avoided and, moreover, run-away of the fish will be materially checked.

Another object is to provide a fishing device of this character which, in its functioning to hook a fish, will apprise the fisherman of the fact that it has so functioned and that the fish should be played or, if the fish has gotten away, that another cast should be made and the device restored to operative condition.

With these and other objects in view the fishing device of the invention comprises a support member, preferably having stake means which may be driven into the ground, or means which may be attached to the side of a boat, or to a railing, post, pier, tree, or other fixed object, a bearing frame member carried by the support member, a fishing rod receiving socket member pivotally mounted on said bearing frame member for limited oscillatory movement with respect to said support member from a depressed position to an elevated position, resilient means connected with said frame member and socket member and serving normally to bias said socket member to its elevated position, cooperating latch means on said frame member and socket member, respectively, and serving when engaged to retain said socket member in its depressed position, fishing line operable trigger means operatively associated with said latch means and functioning to release said latch means in the event of a pull upon the fishing line, resilient means for biasing said trigger means to engaged-latch condition, adjustable means for varying the effect of said trigger biasing resilient means to thereby accommodate the trigger means to actuation in response to a predetermined force of pull upon said fishing line, and means for maintaining desired adjustment of said adjustable means; all as will be described hereinafter more fully and finally claimed.

In the accompanying drawings illustrating the invention, in the several figures of which like parts are similarly designated.

Fig. 1 is a side elevation of the device of the invention with a fishing rod and reel mounted therein, the full lines showing the rod holding socket member in depressed, latched position, and the dotted lines showing its elevated, unlatched position, Fig. 2 is a front elevation of the device as viewed from the right of Fig. 1, Fig. 3 is a sectional elevation taken on the line 3—3 of Fig. 1, looking in the direction of the arrows, Fig. 4 is a partial longitudinal sectional elevation showing the rod holding socket member in depressed, latched position, Fig. 5 is a view similar to Fig. 4, but showing the parts in position assumed under the influence of the resilient socket biasing member immediately after release of the latch mechanism, and Fig. 6 is a perspective view of the oscillatable latch bar and trigger member.

The support member of the device comprises a U-shaped element providing stake members 1 joined and held rigidly spaced by a medially placed strut plate 1' and an upper laterally, rearwardly offset loop 2, and a U-shaped bearing frame member 3 having its legs affixed, as by welding 4 (Fig. 3) to the stake members 1 in spaced relation to and below the offset loop 2.

The rod receiving socket member 5, which is preferably a tube having its rear end 6 (Fig. 4) closed, is provided with a centrally arranged, downwardly projecting combined pivot and latch plate 7 by which the socket member 5 is mounted for oscillatory movement from a depressed to an elevated position, and vice versa, upon a shaft 8 having its ends pivotally bearing in the opposite legs of the U-shaped bearing frame member 3. The socket member 5 is normally biased to elevated position, as shown in dotted lines Fig. 1, by a resilient tension member or spring 9 connected at one end to a depending shank 10 of the plate 7 and its other end to the swivel 11 of the screw-threaded rod 12 axially adjustable in a plate 13 secured to and downwardly offstanding from the bearing bracket member 3, so that the tension of the spring 9 may be adjusted as desired to accommodate the desired relatively instantaneous oscillatory movement of the socket member 5 from depressed to elevated position in relation to the weight of the fishing rod and tackle mounted in it.

Adjacent to its forward end, remote from the pivot at 8, the plate 7 is provided with a recess appropriately shaped to furnish a slanting striker edge 14 which terminates in a latch lip 15 serving, when the socket member is in its depressed position (Figs. 1, 3 and 4) to latchingly engage the periphery of an oscillatable latch bar 16 in proximity to a flattened escape portion 17 of such bar. As shown, the latch bar 16 is pivoted at its opposite ends in the opposite legs of the frame member 3 (see Fig. 3).

Affixed to one end of the latch bar 16 exteriorly of the frame member 3, and capable of imparting to the bar a limited oscillatory movement, is a trigger member 18 the upper end of which carries a crotch element 19 for releasably engaging the fishing line. The lower end of this trigger member is provided, at points preferably equally spaced above and below the pivotal point of the latch bar 16, with means, such as the ears 20, for one end attachment of a pair of latch bar and trigger control resilient members or springs 21 and 22 the other ends of which are attached to the opposite ends of a rock lever 23 medially pivoted upon a bolt or threaded shaft 24 mounted in the bearing frame member 3. In order that a fine adjustment of the tension, and hence the biasing effect, of the springs 21 and 22 may be obtained so that the desired hair-trigger action of the latch mechanism 15, 16, 17 may be provided, and proper rest position (Figs. 1 and 4) of the trigger member assured, an adjusting cam 25 is eccentrically pivoted by a binding screw 26 upon the frame member 3 with its periphery normally in contact with the adjacent edge of the rock lever 23. Obviously, by rotating the cam 25 the rock lever may be caused to pivot against or under the influence of the tension of the springs 21 and 22, respectively, until the desired hair-trigger action of the latch parts is attained. After such adjustment the cam 25 may be secured by the screw 26 and the rock lever fixed by a wing nut 27 or the like to maintain the adjustment. If desired, the rock lever 23 and cam 25 may be backed up by appropriate lock washers 28 and 29, respectively (Fig. 3), disposed between them and the face of the frame member 3.

A fixed stop 30 appropriately located on the frame member 3 (see particularly Figs. 4 and 5) serves to prevent overcarry of the line-released trigger member 18.

The rod socket member 5 is provided with an automatic reel fingering member 31 preferably in the form of a resilient, suitably-contoured, element adapted to press against the line on the reel of the fishing rod.

In using the device the stakes 1 may be driven into the ground by pressure applied to the offset loop element 2, or the support member may be attached to the gunwale of a boat, or to a railing, post, pier, tree, or other fixed object, by a suitable clamp, not shown but the provision of which is common for devices in this art, and preferably the rod socket member 5 is arranged in its elevated position as shown in dotted lines, Fig. 1.

Then, when the fisherman has made his cast with the rod R he will place the handle of the rod in the socket member 5 (dotted lines, Fig. 1) and oscillate the socket member upon its pivot 8 to its depressed position (as shown in full lines, Fig. 1 and Fig. 4) so that the spring 9 will be put under desired tension and, by snap action of the latch parts 14, 15, 16, 17, the latching mechanism will serve to retain the socket member, with the rod, in this depressed position. Any slack in the line *l* is then taken up upon the reel *r* and that portion of the line *l* between the last guide ring *g* of the rod and the reel *r* is looped over and in engagement with the crotch element 19 of the trigger member 18, substantially as shown.

With the parts of the device thus set it will be apparent that any jerk upon the cast line *l* such as would be occasioned by the bite of a fish will cause the upper end of the trigger member 18 to move forward upon its pivot with the latch bar 16 thus oscillating the latch bar, substantially as indicated in Fig. 5, to free the latch lip 15 past the flattened portion 17 of the latch bar, whereupon the spring 9 will cause the rod socket 5, with the rod R, to quickly move, or snap, to its elevated position, thus hooking the fish. Any overswing of the rod socket 5, and hence of the rod R, may be arrested by the loop extension 2 of the support.

Obviously, the trigger control springs 21 and 22 may be so adjusted by setting of the rock lever 23 that the trigger member 18 will be responsive to a predetermined intensity of pull or jerk upon the line *l* to free the latch mechanism, and when this mechanism has been freed these springs will at once return the trigger member, and with it the latch bar 16 to normal position as shown in Figs. 1 and 4 ready for reengagement of the latch lip 15 with the periphery of the latch bar 16 when the rod socket is again oscillated to its depressed position. Excess forward oscillation of the trigger member 18 will be prevented by its engagement with the fixed stop 30.

It will be noted that the resilient pressure automatically exerted upon the reel *r* by the fingering member 31 will not only prevent undue spinning of the reel with possible resulting backlash or "bird-nesting" of the line when the rod R snaps back to the elevated position, but will act as a brake to retard the run of a hooked fish.

When the fish has been hooked the fisherman can take the rod R from the rod socket 5 and play the fish in the ordinary manner.

As is well known to fishermen, many fish are lost because the fisherman fails to react properly to the jerk on the line caused by a bite. The device of the invention being set to respond automatically and properly to such a jerk reduces the chance of loss of the fish to a minimum.

Of course, whether a fish has been hooked or not the presence of the rod R in its elevated position will be notice to the fisherman that it needs his attention.

Various changes and modifications are considered to be within the principle of the invention and the scope of the following claims.

What I claim is:

1. In a fishing device, a support member including means for positioning it in a desired fishing location, a bearing frame member carried by and offstanding from said support member, a fishing rod receiving socket member pivoted on said frame member for oscillation with respect thereto and to said support member from a depressed position to an elevated position and vice versa, resilient means interposed between said socket member and frame member and serving normally to bias said socket member to its elevated position, a latch member carried by said socket member, a latch bar pivotally mounted in said frame member for oscillation therein and serving for engagement by said latch member to releasably retain said socket member in its depressed position, a fishing line engaging trigger member carried by and adapted to impart oscillation to said latch bar in response to movement imparted to said trigger member by a pull on said fishing line to cause release of said latch member from said latch bar, and means serving normally to bias said trigger member and latch bar to engaged-latch position, including spring means having end connections with said frame member and a trigger member and means for varying the biasing effect of said spring means including a rock lever pivoted to said frame member and to which said spring means are connected and means for varying the angular position of said rock lever upon its pivot to thereby vary the biasing effect of said spring means.

2. A fishing device as claimed in claim 1, in which the means for varying the angular adjustment of said rock lever comprise an angularly adjustable eccentric cam pivotally mounted on said frame member adjacent to said rock lever and having its peripheral edge normally in contact with the adjacent edge of said rock lever.

3. A fishing device as claimed in claim 2, in which means are provided for securing said rock lever and cam in an adjusted position to thereby maintain a predetermined biasing effect of said spring means upon said trigger member.

4. A fishing device as claimed in claim 1, in which the spring means for biasing said trigger member and latch bar to engaged-latch position comprise a pair of similar springs connected respectively to said rock lever and trigger member above and below the pivots thereof, the means for varying the angular position of said rock lever serving to vary the tension of said springs.

References Cited in the file of this patent

UNITED STATES PATENTS

| | | |
|---|---|---|
| 1,475,257 | Bottone | Nov. 27, 1923 |
| 2,473,778 | Benes | June 21, 1949 |
| 2,615,273 | Meller | Oct. 28, 1952 |
| 2,518,090 | Kimura | Nov. 18, 1952 |
| 2,657,492 | Skorr | Nov. 3, 1953 |
| 2,744,351 | Smith | May 8, 1956 |